United States Patent Office 3,173,868
Patented Mar. 16, 1965

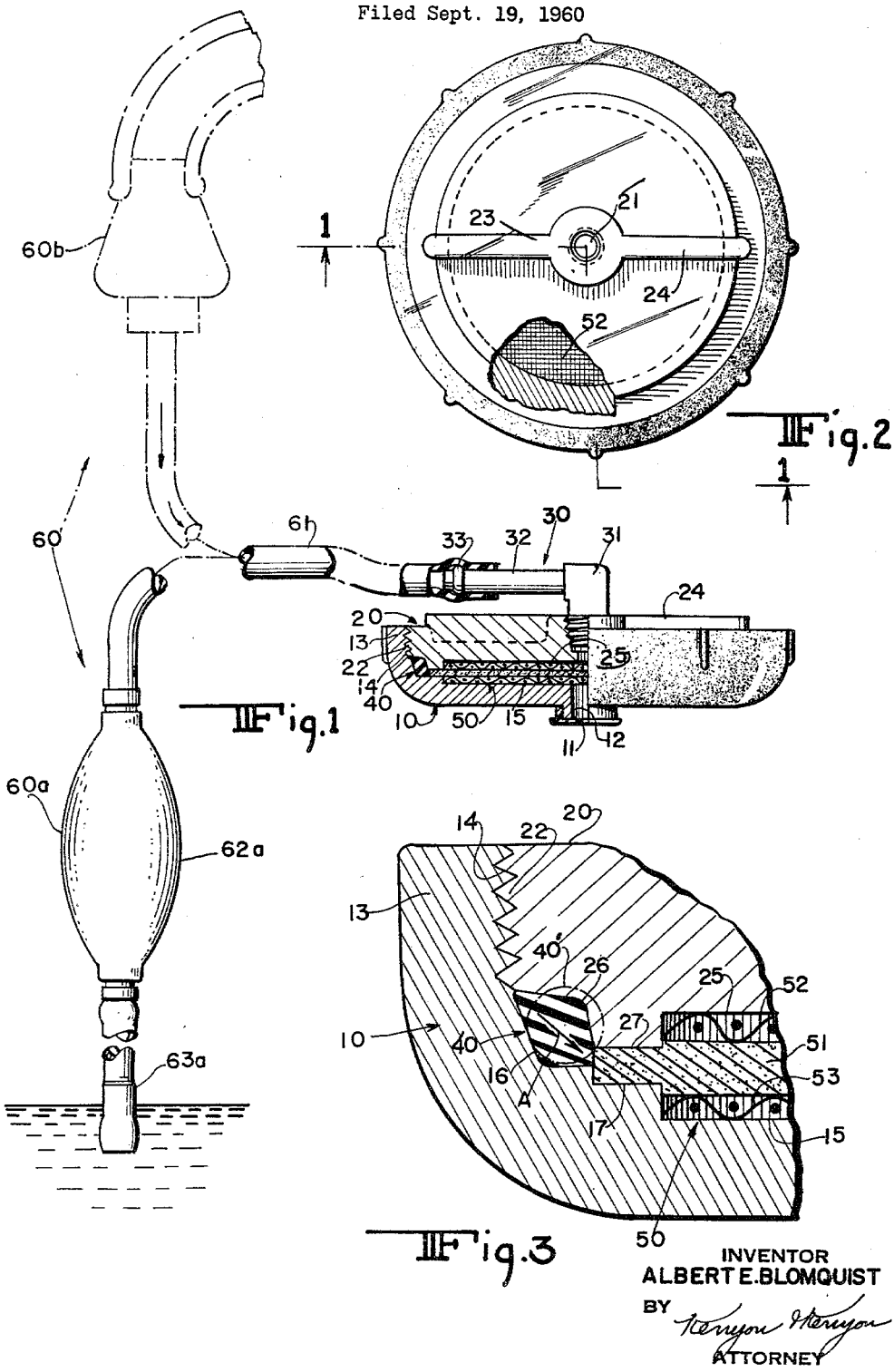

3,173,868
FILTERING APPARATUS AND SEAL THEREFOR
Albert E. Blomquist, Ringoes, N.J.
Filed Sept. 19, 1960, Ser. No. 56,731
2 Claims. (Cl. 210—445)

This invention relates to devices for the filtration of liquids and more particularly relates to drinking water bacteria and solute filtration systems that are both portable and rejuvenatable.

The filtration principle, whereby liquid molecules are free to pass through a solid matrix or mat while larger particles in the liquid are retained in the solid, as well known. Filters of this type may utilize any of several constructions. Thus there are loose or granular membrane filters, felted or woven membrane filters, rigid porous membrane filters, and semi-permeable membrane filters.

Modern filters are capable of discriminating between the desired liquid molecules and undesired particles therein so finely that filters that will remove solute molecules such as salt or disease-causing micro-organisms are commercially available. Such filters obviously must be discardable, since washing of a filter of such discriminating nature would inordinately risk microscopic perforation.

Modern conditions require that men inhabit almost all parts of the globe for purposes of military posture, or scientific research, or geopolitics. Thus it is that Western men, unaccustomed to tropical living, find themselves faced with conditions dangerous to the non-native who has not been acclimated. Typical examples are soldiers in jungle expeditions and airmen either voluntarily or involuntarily placed in a tropical setting. No less common is the plight of the ordinary tourist who finds the local tap or well water dangerous to him because of his lack of natural immunity to the disease agents therein.

Despite the great military and other demand for a filter device that would remove all disease agents from water, and yet have extreme compactness, simplicity, and replaceability of the filter agent after each sustained use, the art has been confounded by the seemingly insurmountable problem of sealing a filter element in place with the extreme reliability and yet ease of replacement required.

Since the filtration problem presented demands removal of individual organic and inorganic molecules, the sealing problem correspondingly requires retention or non-passage of matter of similar size. Attempts to calk the filter in place, or to cement it in place, are of no avail because these approaches actually cause worse retention on any usage subsequent to replacement of the first filter element. Also, such methods are not feasible for jungle survival kits. Attempts to employ a gasket-type filter to give such high efficiency both intially and upon multiple replacements have failed heretofore because gaskets refused to seat with such reliability and, if seated by pressure, have caused the filter itself to leak by reason of deformation.

The countervailing problem of replaceability with undiminished reliability of operation has thus been as crucial as the problem of sealability to such a rigorous degree itself. Prior art attempts have always compromised one of these seemingly mutually exclusive ends. Yet the standard of utility for such a device can admit of no compromise, because in dealing with virulent tropical disease germs it is often no better to exclude nearly all than to exclude only a large fraction. To men in the tropics where disease germs go through a very fast multiplying colonization, the water supply must be pure in the most consistent and fastidious sense.

It is, therefore, the general object of the present invention to provide a replaceable filter device of very light weight, small size and portability that will filter out all foreign elements from liquids, including micro-organisms, so as to be of high utility as a drinking water purifier, especially in an airborne tropical survival kit.

Another object of the present invention is to provide means for sealing submicroscopic particle filters so that no bypass of the filter element occurs, and so that the filter element is replaceable without any loss of this characteristic sealing efficiency.

A further object of the present invention is to provide such a filter device wherein the replacing operation involves manipulation of a minimum of parts and steps, and wherein no sealing parts are discarded with the filter element itself.

Another object of the present invention is to provide a filter device with the foregoing characteristics that employs a minimum of parts, and whose mating parts are symmetrical in all dimensions so that remating cannot present a mismatch of parts and inadvertently cause an imperfect reseal upon filter replacement.

A still further object of the present invention is to provide a filter device having a construction that assures a precise seal upon each filter element replacement without any need for adjustment or gauging of said seal.

These and other objects will become more apparent as the invention is hereafter disclosed in greater particularity.

Briefly stated, the essence of the invention resides in a new and novel approach to the employment of sealing gaskets and filter spacers and retainers. Characteristics of stress and geometry are employed to provide a very precise-gasket-to-sealed-surface alignment with a very delicate gasket-to-sealed-surface pressure, so as not to distort and therefore perforate the filter. Mesh spacers are employed to prevent flexure and consequent leakage in the plane of the filter element and to evently distribute the liquid over the filter. And yet this delicate positioning and pressuring of the gasket-to-filter interface is accomplished without any need for external delicacy or adjustment in remating the parts. Two parts simply screwed together to termination assure, without more, the aforesaid sealed flexureproof seat capable of preventing micro-organisms from bypassing or channeling through the filter element.

The gasket and the various spacer parts are arranged so that the gasket is in predetermined stress in a direction not affecting the filter and yet effectively mating with the filter. Thus the filter is not buckled or otherwise damaged by gasket pressure. The filter is also effectively prevented from flexing from its normal plane by the construction of the spacer parts. The stressless seal of a delicate and predictable nature and the lack of any destructive flexing of the filter in any direction combine to attain the heretofore impossible results of a perfect replaceable filter of simple design suitable for airborne tropical use.

In the drawings:

FIG. 1 is a partial sectional elevational view of the filter assembly comprising the present invention showing internal structure of the filter chamber and one form of liquid supply in solid outline and an alternative second form of liquid supply in phantom outline.

FIG. 2 is a plan view of the filter chamber of FIG. 1 with a partial sectional view of internal details of construction.

FIG. 3 is a blown up detail view of the sealing configuration shown in section in FIG. 1.

With reference to the drawings, wherein like numbers define like parts in all views thereof, the invention comprises in general a female filter chamber portion 10, a male filter chamber member 20, an intake member 30, a gasket 40, a filter element assembly 50, and a source assembly 60.

Filter element assembly 50 comprises a submicroscopic filter element 51 and a pair of screens 52 and 53. Filter element 51 may be any commercially available filter having the capabilities of removing micro-organisms and solute. In addition, the filter should be relatively self-supporting, that is, it should not tend to disintegrate under fluid flow if unsupported. While it need not have any appreciable tensile strength when used with the instant invention, as hereinafter explained, it should have some tear strength and be more than a matrix without internal cohesion. In the embodiment of the invention described herein filter element 51 is preferably circular, but where the invention is practical with mating parts of other outlines, appropriately shaped filters of matching outline may be substituted.

Screens 52 and 53 are of equal dimensions and of matching outline to filter element 51. When filter element 51 is circular, therefore, screens 52 and 53 are also circular, but are of slightly less diameter than filter element 51 for a reason to be hereinafter explained. All parts throughout the practice of the invention are preferably of a non-toxic, non-corrodible nature because of the germicidal nature of the device and product and because of the resistance to tropical environment that is desired. Accordingly screens 52 and 53 are preferably woven of plastic wire. Screens 52 and 53 are loosely woven so that appreciable interstitial spaces appear both normal to the plane of the screens and within their plane, for a reason to be hereinafter explained.

Filter chamber portions 10 and 20 are mating parts and are preferably formed by a durable plastic material resistant to heat, light, shock and fatigue of the intensity encountered in repeated tropical use. Male chamber portion 20 is an essentially disc-shaped member having a centrally located orifice 21 suitably threaded for reception of intake member 30. At the outermost edges of disc-like member 20 appear threads 22 adapted to mate with female chamber portion 10, as hereinafter described. Part of the disc-like outline of chamber portion 20 is circumferentially depressed in the area intermediate threads 22 and orifice 21. This depression serves to lessen the weight of the overall assembly and also lessens the height of ribs 23 and 24. These ribs serve the dual function of strengthening the assembly against flexure and of acting as handles to apply torque to unscrew male portion 20 from its female mating portion 10, as hereinafter described.

At the lowermost surface of male chamber portion 20 appears a centrally located circular depressed portion 25. This depressed portion 25 is of equal diameter and nearly equal depth, as is screen 52, heretofore described, and is thereby adapted to nearly flushly receive screen 52. When screen 52 is disposed within depression 25, close diametrical registration is attained, but screen 52 is slightly recessed into depression 25. At the lowermost circumferential outermost corner of male portion 20 appears a circumferential groove 26 completely encircling member 20. This groove 26 coperates with a similar groove in female chamber portion 10 to define an annular passageway when the parts 10 and 20 are fully mated. This passageway will be more fully described hereinafter. Groove 26 and depressed portion 25 define between them on male chamber portion 20 an annular lip portion 27.

Female chamber portion 10 is a generally bowl-shaped member preferably formed of a plastic similar to that of male chamber portion 20. Chamber portion 10 has a centrally located orifice or outlet means 11 therein disposed to emit filtered liquid from the assembly, as hereinafter described. A plastic cap 12 may be snapped over the orifice to close it and thereby prevent drying out of the wetted filter and chamber when not in use. Chamber portion 10 has an upturned periphery 13 having threads 14 on the inner face thereof matching and adapted to mate with threads 22 on male chamber portion 20.

Female chamber portion 10 also has a depressed centrally located portion 15 corresponding to depressed portion 25 in male chamber portion 20. Consequently, depressed portion 15 fully receives screen 53 in close diametrical registration, and screen 53 very nearly lies flush within depression 15, being slightly recessed therein. Chamber portion 10 also has an annular groove 16 corresponding to groove 26 in chamber portion 20. While depressed portion 25 and groove 26 of male chamber portion 20 cooperated to define lip 27, groove 16 and depressed portion 15 of the female chamber portion 10 do not so cooperate. Rather, they define stepped portion 17 by virtue of the fact that groove 16 lies above reference portion 17 which defines portion 15 therebelow as depressed.

In registration, female chamber portion 10, male chamber portion 20, filter assembly 50 and gasket 40 cooperate as follows. When male portion 20 has been screwed down into female portion 10 so that filter assembly 50 and gasket 40 are properly positioned therebetween, groove 26 in male chamber portion 20 and groove 16 in female chamber portion 10 cooperate to define an annular passageway therebetween disposed to deform gasket 40 (the natural cross section of which is circular as shown at 40') and to retain the deformed gasket in the passageway so formed so as to completely fill the passageway without voids. The nature of this action and the action of portions 10 and 20 on filter assembly 50 will be hereinafter described.

As to the configuration of the annular passageway formed by grooves 16 and 26, various geometric cross sections may be employed, but polygonal figures are preferred in general, and the preferred specific embodiment is to present a passageway having four non-parallel sides in cross section, and in all embodiments said annular passageway is equal to, or very slightly less than, the cross sectional area of undeformed circular cross section gasket 40'. Since the cross sectional area of the annular passageway is essentially equal to the area of the undeformed gasket 40, the imprisonment of gasket 40 within the annular passageway causes deformation but little or no volume compression of the gasket 40.

Additionally the four sides of the annular passageway defined by grooves 16 and 26 are arranged so that the center of area of gasket 40' is not advanced toward filter assembly 50 when the gasket is deformed into the said annular passageway. Thus the center of area of circular undeformed gasket 40' is advanced only along a line essentially perpendicular to the arrow A in FIG. 3

The aforesaid conditions of essentially equal area of the gasket 40 before and after deformation and non-advancement of the center of area toward the filter assembly 50 are considered important to achieve the seal contemplated. However, it is understood that in a broader sense a stress-distorted gasket of exactly predictable configuration is contemplated by the foregoing, and the lack of area change and non-advancement of the center of area serve to guarantee that the gasket pressure on filter assembly 50 will be relatively unaffected by swelling or shrinking of undeformed gasket 40' as is common in the tropics.

The particular orientation of the four sides of the annular passageway formed by grooves 16 and 26 is as follows. The faces of groove 26 preferably include a 110° angle, while the faces of groove 16 preferably include a 100° angle. Both grooves have rounded bottoms at the intersections of the respective groove faces. With respect to the plane of filter assembly 50 taken as horizontal, the lower face of groove 16 is preferably at 0°, that is, that face is horizontal while the other face of groove 16 is preferably at 100° from the horizontal of said first face. Groove 26 has a face nearest filter assembly 50 that is preferably 105° from the horizontal while the other face of groove 16 is preferably 110° from said first face. Thus the four angles included internally within the chamber are 75° for the uppermost acute angle, 110° for the angle of groove 26, 75° for the lowermost acute angle, and 100° for the angle of groove 16.

It will be noted that the inside diameter of gasket 40', that is as undeformed, is slightly smaller than the diameter of filter element 51 in filter 50. Such a relationship brings the gasket material into proper alignment relative to filter element 51 when deformed to the outline of the annular passageway formed by grooves 16 and 26. Circular cross section, circular inside diameter gaskets are commonly known as O rings. It is peferred to use a rubber or rubber-like O ring for gasket 40 that is relatively non-toxic and impervious to virulent agents and tropical conditions. Such a gasket would ideally substantially regain its circular cross section 40' upon release from its distorted cross section 40 almost instantaneously.

The centrally disposed orifice or intake means 21 in male chamber portion 20 is preferably pipe threaded so as to receive right-angled fixture 31 of intake member 30. A flexible tubing 32 is connected to right-angled fixture 31, and terminates in a bulbar portion 33. Bulbar portion 33 is disposed to receive tightly a flexible inert intake tubing 61 of source assembly 60. This tubing is shown partly in phantom outline to indicate it may be considerably extended in practice.

Two major forms of source assembly 60 are contemplated. For jungle or camping use it is contemplated that only natural water will be available. Consequently assembly 60a is employed. This embodiment comprises a bulb 62a having a ball valve therein (not shown). Depending from bulb 62a is suction tube 63a disposed to be inserted into the source liquid. Pressure on bulb 62a pumps liquid through tube 61 and into the filter assembly chamber. Release of bulb 62a sucks fluid through tube 63a into bulb 62a. Plug 60b is the alternative source assembly and is to be used when dubious native tap water is to be filtered. Plug 60b is of a size, composition and shape to forcibly fit water tap openings. Water is thus communicated from a tap to tube 61 and thence to the filter assembly. It is preferred to fabricate all parts in both embodiments of surgical rubber or other non-toxic environment-resistant rubber-like material.

In operation, male and female chamber portions 20 and 10 are unscrewed by the aid of ribs 23 and 24. A filter assembly 50 comprising a filter element 51 sandwiched between screens 52 and 53 is then placed into recessed portion 15 in female chamber portion 10. Gasket 40' is then centered on filter element 51. Male and female chamber portions 20 and 10 are then screwed into the mating position shown in FIGS. 1 through 3, until the parts bottom. When this condition is attained, lip 27 and stepped portion 17 will have very slightly compressed an annular portion of filter element 51. Also depressed portions 25 and 15 of male and female chamber portions 20 and 10, respectively, will have encased the remaining portion of filter assembly 50 in close registration, except for the central portion faced by orifices 11 and 21. This close registration will prevent any flexure of filter element 51 that might otherwise cause microscopic channeling of the element.

The loose warp and woof of the plastic wire of screens 52 and 53 will smoothly conduct liquid from intake means orifice 21 and spread it evenly across the surface of filter element 51, and yet will hold said element in fixed planar relation, as aforesaid.

The gasket 40' will in the same screwing down operation be distorted to a known outline defined by the passageway formed by grooves 16 and 26. Since the passageway formed has the same approximate area as the undeformed gasket 40', the deformed gasket 40 will not be reduced in volume. Hence the pressure on the peripheral edge of filter element 51 by deformed gasket 40 will not depend on a uniform spring constant in the gasket. Thus manufacturing variations and uneven tropical effects are minimized in their effect on sealing pressure on filter element 51. Since the center of area of gasket 40' is not shifted toward filter 51 when the gasket is deformed to 40 in the annular passageway, a very light predictable pressure is exerted on filter 51 by gasket 40 dependent only on the geometry of grooves 16 and 26.

When male and female chamber portions 20 and 10 have been thus screwed down, filter element 51 is entrapped so that no movement in any direction, including flexure, can occur. Thus channelization and unfiltered fluid is avoided. And a very light but very precise and predictable seal is effected at the edge of filter 51 by distorted gasket 40, thus preventing fluid bypass with a predictable touch that cannot crush or buckle the filter microscopically as prior art devices not designed for submicroscopic replaceable element use have been disposed to do. Such crushing or buckling of such high filtration filters is itself a cause of leakage. Moreover, even distribution of liquid across filter element 51 so as to avoid clogging locally is effected in an extremely compact assembly.

When so assembled, liquid may be introduced through intake means orifice 21 either by pumping bulb 62a or plugging in alternative plug 62b as appropriate. The liquid will spread through screen 52 over filter element 51 and will be strained free of solute and micro-organisms. The strained liquid will collect in screen 53 and will be emitted by outlet means orifice 11. Cap 12 may be affixed to prevent drying out of the internal components during periods between use, or to protect the components during storage.

The device of the instant invention allows attainment of filtration to the theoretical extent capable by the best commercial filter elements. By a unique combination of stressed gasket and filter screens, it prevents channeling and bypass which have heretofore made it impossible to fabricate a small portable filter device that could be so reliable in thees respects that it could be utilized in a jungle survival kit, and could be fully rejuvenatable as to the filter element without any loss of filtering efficiency. The particular mode of stressing the gasket guarantees a perfect seal each time, and of a predictable pressure so as not to deform the filter element with consequent channelization. Moreover, the mode of stressing the gasket makes variations in that elements strain characteristics and localized imperfections of resiliency less important than in conventional arrangements.

While a particular embodiment has been described, it is not contemplated that the invention is restricted thereto, but rather variations in materials and particular arrangements of parts may be practiced without departing from the scope and spirit of the invention.

What is claimed is:

1. A liquid filtering device which comprises a disk shaped filter element compised of flexible sheet material of substantial thickness, chamber means comprising oppositely disposed chamber-forming portions one of which has an inlet opening passing therethrough and the other of which has an outlet opening passing therethrough, said portions having annular lip means presenting flat surfaces disposed respectively in opposed relation on opposite sides of said filter element along and adjacent the margin thereof throughout the peripheral extent of said filter element and in substantially spaced relation with reference to said inlet and said outlet respectively, means for holding said filter element against flexure substantially throughout the extent thereof within said margin and adapted to permit passage of liquid between the opposite surfaces of said filter element substantially throughout the extent thereof within said margin and said inlet and said outlet respectively, means for urging said chamber portions together and holding same in position with said lips in pressure contact with said margin of said filter element, an annular pasageway surrounding said periphery of said filter element in offset relation with respect thereto, said passageway being defined by spaced apart opposed walls including walls of the respective chamber-forming portions that are disposed predominantly transversely with respect to the direction of relative movement of said chamber portions when said portions are urged together, a wall presented by one of said chamber portions disposed predominantly in said direction of said relative movement and terminating substantially flush with the periphery of said filter element leaving at least a portion of the thickness of said periphery exposed in open communication with the interior of said passageway, and a wall presented by the other chamber member in opposed relation to said last named wall and in opposed relation to said portion of the periphery of said filter element, the cross-section of said passageway constituting a four-sided figure having two oppositely disposed included angles of approximately 75° one leg of one of which angles is interrupted by a portion of the periphery of said filter element, a third included angle of approximately 100° and a fourth included angle of approximately 110°, one of the legs of said approximately 100° angle being approximately parallel with respect to said filter element and intersecting the periphery of said filter element intermediate the thickness thereof, and stressed gasket means filling said passageway and in pressure contact with said portion of the periphery of said filter element.

2. A liquid filtering device according to claim 1 wherein the apex of each of said 100° and 110° angles is rounded.

References Cited in the file of this patent

UNITED STATES PATENTS

| | | |
|---|---|---|
| 865,691 | Fox | Sept. 10, 1907 |
| 979,481 | Hannold | Dec. 27, 1910 |
| 2,251,964 | Stackhouse | Aug. 12, 1941 |
| 2,256,145 | Hock | Sept. 16, 1941 |
| 2,547,797 | Torrey | Apr. 3, 1951 |
| 2,760,642 | Wallace | Aug. 28, 1956 |
| 2,862,623 | Werner | Dec. 2, 1958 |
| 3,031,082 | Smith | Apr. 24, 1962 |